(12) United States Patent
Marupaduga et al.

(10) Patent No.: US 10,756,429 B1
(45) Date of Patent: Aug. 25, 2020

(54) DYNAMIC VARIATION OF POWER PER ANTENNA TO FACILITATE BEAMFORMING OF ANTENNA ARRAY

(71) Applicant: Sprint Communications Company L.P., Overland Park, KS (US)

(72) Inventors: Sreekar Marupaduga, Overland Park, KS (US); Rajveen Narendran, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 343 days.

(21) Appl. No.: 15/933,109

(22) Filed: Mar. 22, 2018

(51) Int. Cl.
*H01Q 3/28* (2006.01)
*H01Q 3/26* (2006.01)
*H04W 16/28* (2009.01)

(52) U.S. Cl.
CPC .............. *H01Q 3/28* (2013.01); *H01Q 3/2605* (2013.01); *H04W 16/28* (2013.01)

(58) Field of Classification Search
CPC ...... H01Q 3/2605; H01Q 3/2658; H01Q 3/28; H01Q 21/00; H04W 16/28
See application file for complete search history.

(56) References Cited

U.S. PATENT DOCUMENTS

| | | | | |
|---|---|---|---|---|
| 2007/0273869 | A1* | 11/2007 | Van Hout | G03F 7/70591 356/124 |
| 2010/0278136 | A1* | 11/2010 | Oyman | H04W 52/241 370/330 |
| 2011/0077716 | A1* | 3/2011 | Rofougaran | G16H 10/65 607/60 |
| 2015/0276926 | A1* | 10/2015 | Bowers | G01S 13/887 342/5 |

* cited by examiner

*Primary Examiner* — Dao L Phan (57) ABSTRACT

Methods and systems are provided for dynamically adjusting the beamform of an antenna array. A first beamform produced by an emission from a first antenna and an emission from a second antenna are determined, each of the first antenna and the second antenna having separate power supplies. Positions of user devices served by the cell of the antenna array are determined and compared to the first beamform. If it is determined that a second beamform would provide better coverage to any one or more of the user devices served by the cell, any one or more of the power supplies to individual antennas may be modified. Any one or more power supplies may utilize changes in the phase and/or amplitude of the power supplied to an antenna to change the emission of at least one antenna, producing a second beamform. The second beamform, in particular, may permit dynamic targeting of various vertical distributions of user devices within the cell.

20 Claims, 8 Drawing Sheets

DYNAMIC VARIATION OF POWER PER ANTENNA TO FACILITATE BEAMFORMING OF ANTENNA ARRAY

SUMMARY

The present disclosure is directed, in part, to dynamic variance of power per antenna to facilitate beamforming of an antenna array, substantially as shown in and/or described in connection with at least one of the figures, and as set forth more completely in the claims.

In aspects set forth herein, a power supply to each antenna of an antenna array may be individually controlled and the phase and/or amplitude adjusted in order to change the beamform of the antenna array. While typically 3D beamforming may be achieved using a variety of physical means, including actuators, motors, and wave guides, aspects herein enable 3D beamforming by dynamically controlling the power supply to any of one or more antennas of an antenna array. While conventional devices may have a power supply to each individual column of antennas, changing the power supply to an entire column may yield only horizontal beamforming, in contrast to the 3D beamforming described herein. A conventional array, therefore, may not have the capability to provide a high quality of service to different user devices at different elevations and, even more, at different times. For example, an antenna configured to serve a high-rise structure of evenly dispersed user devices may not provide quality services to an increased density of user devices at a ground-level restaurant (or vice versa). However, here, the beamform may be dynamically and three dimensionally adjusted using a power supply to each antenna of an antenna array in order to shape a radiation pattern to provide simultaneous high quality service to a plurality of user devices in any device distribution without needing to physically alter any antenna.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
CD-ROM Compact Disk Read Only Memory
CDMA Code Division Multiple Access
eNodeB Evolved Node B
GIS Geographic/Geographical/Geospatial Information System
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
UMTS Universal Mobile Telecommunications Systems Further, various technical terms are used throughout this description. An illustrative resource that fleshes out various aspects of these terms can be found in Newton's Telecom Dictionary, 25th Edition (2009).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (e.g., cell sites, cell towers) to provide network coverage. The base stations are employed to broadcast and transmit transmissions to user devices of the telecommunications network. Factors that can affect the telecommunications transmission include, e.g., location and size of the base stations, frequency of the transmission, among other factors.

Generally, conventional antennas may either have a fixed beam pattern or may only be capable of dynamically varying the horizontal radiation pattern of a beamform. In a fixed pattern antenna, the antenna beam patterns are fixed once the antenna is installed at a base station. While the direction of a beam can be modified manually or with antenna motors, the transmission beam emitted by the antenna is generally of a fixed shape and distance. Some antennas, or antenna arrays, are capable of dynamically varying the horizontal radiation pattern of a beamform. For example, a conventional cell site may comprise two or more columns of antennas, each column having its own power supply. By adjusting the power supply to one or more columns, the horizontal radiation pattern of the beamform may be adjusted—but not the vertical radiation pattern.

A full dimension multiple input multiple output (FD-MIMO) antenna (also known as massive MIMO, or active antenna array), on the other hand, can generate a more focused beam that is directed to one or more devices within a general vicinity of the antenna. A FD-MIMO base station can include multiple antennas and transmitters that broadcast, transmit and receive transmissions. With FD-MIMO technology, a base station can form a beam in both horizontal and vertical directions so that the transmission of a signal can be more focused and directed to a particular area and location within its transmission range.

Beamforming is conventionally employed to provide a directional data transmission to a specific user device, so that data on a traffic channel or data plane can be sent to that specific user device. However, beamforming has typically been employed to provide data to that specific user device and not to a group of user devices located within a given sector. Moreover, beamforming has either been done via actuators that change the physical orientation of an antenna (or antenna array), or when done without physical means, only horizontally beamformed.

In accordance with embodiments described herein, location and channel quality information associated with a plurality of user devices can be collected and analyzed to dynamically adjust a beamform using the power supplies of one or more antennas in an array. For example, user device locations and channel quality can be employed to determine a device distribution (e.g., area, shape, distance) or an expected device distribution for a sector of a base station at any particular time. Each of the plurality of antennas of the antenna array may be supplied with its own power supply, the power supply controlled to form a particular emission of each antenna. The cumulative effect of the emissions of the plurality of the antennas in the antenna array is to create a cumulative radiation pattern. The beamform can then be utilized to transmit and receive data from the user devices based on their actual or estimated distribution within the cell.

Being able to provide a system for varying power supplies to dynamically modify the 3D beamform of an antenna array provides a variety of technical benefits, including benefits for users. On the network side, more network efficiencies are realized when the beam emitted from an antenna is capturing the most users, and on the flip side, those users are provided with a better overall experience.

As employed herein, user equipment (UE) (also referenced herein as a user device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station. A UE may be, in an embodiment, similar to device 100 described herein with respect to FIG. 1.

As used herein, user devices that are vertically separated or vertically distributed from other user devices are ones that are located physically higher or lower than the others, relative to a ground level. For example, a user device that is located on the 20th floor of a building is vertically separated from, and located higher than, a user device that is on the first floor of that building. Similarly, a user device that is on the $10^{th}$ floor of a building is vertically separated from, and higher than, a user device on the second floor. The degree of separation could be small or large, as user devices that are just one floor away from one another would still be considered to be vertically separated. Similarly, user devices that are horizontally or horizontally distributed from other devices describes a distribution wherein two devices having the same elevation and same distance from the antenna array are at different locations (though horizontally distributed devices may have different elevations and different distances in addition to different horizontal positions).

Accordingly, in a first aspect of the present disclosure, an embodiment is directed to a method for dynamically adjusting a beamform in one or more wireless communications networks. The method includes determining that a first antenna of an antenna array is supplied with a first power supply and a second antenna of the antenna is supplied with a second power supply, wherein an emission from the first antenna and an emission from the second antenna produce a first beamform; determining the positions of a plurality of UE in a cell served by the antenna array; comparing the positions of the plurality of UE in the cell to an area served by the first beamform; and adjusting one or more of the first power supply and the second power supply to produce a second beamform.

In a second of the present disclosure, an embodiment is directed to A non-transitory computer storage media storing computer-usable instructions that, when used by one or more processors cause the one or more processors to determine that a first antenna of an antenna array is supplied with a first power supply and a second antenna of the antenna array is supplied with a second power supply, wherein an emission from the first antenna and an emission from the second antenna produces a first beamform; determine the likely positions of a plurality of UE in a cell served by the antenna array based on historical locations of UE in the cell; compare the likely positions of the plurality of UE in the cell to the area served by the first beamform; and provide instructions to adjust one or more of the first power supply and the second power supply to produce a second beamform.

In a third aspect of the present disclosure, an embodiment is directed to A system for dynamically adjusting a beamform in one or more wireless communications networks, the system comprising one or more processors; an antenna array comprising a first antenna and a second antenna; and one or more non-transitory computer storage media storing computer-usable instructions that, when used by the one or more processors, cause the one or more processors to: determine that the first antenna of the antenna array is supplied with a first power supply and the second antenna of the antenna array is supplied with a second power supply, wherein an emission from the first antenna and an emission from the second antenna produces a first beamform; determine the positions of a plurality of UE in a cell served by the antenna array; compare the positions of the plurality of UE in the cell to an area served by the first beamform; and provide instructions to adjust one or more of the first power supply and the second power supply to produce a second beamform.

Figure 1:
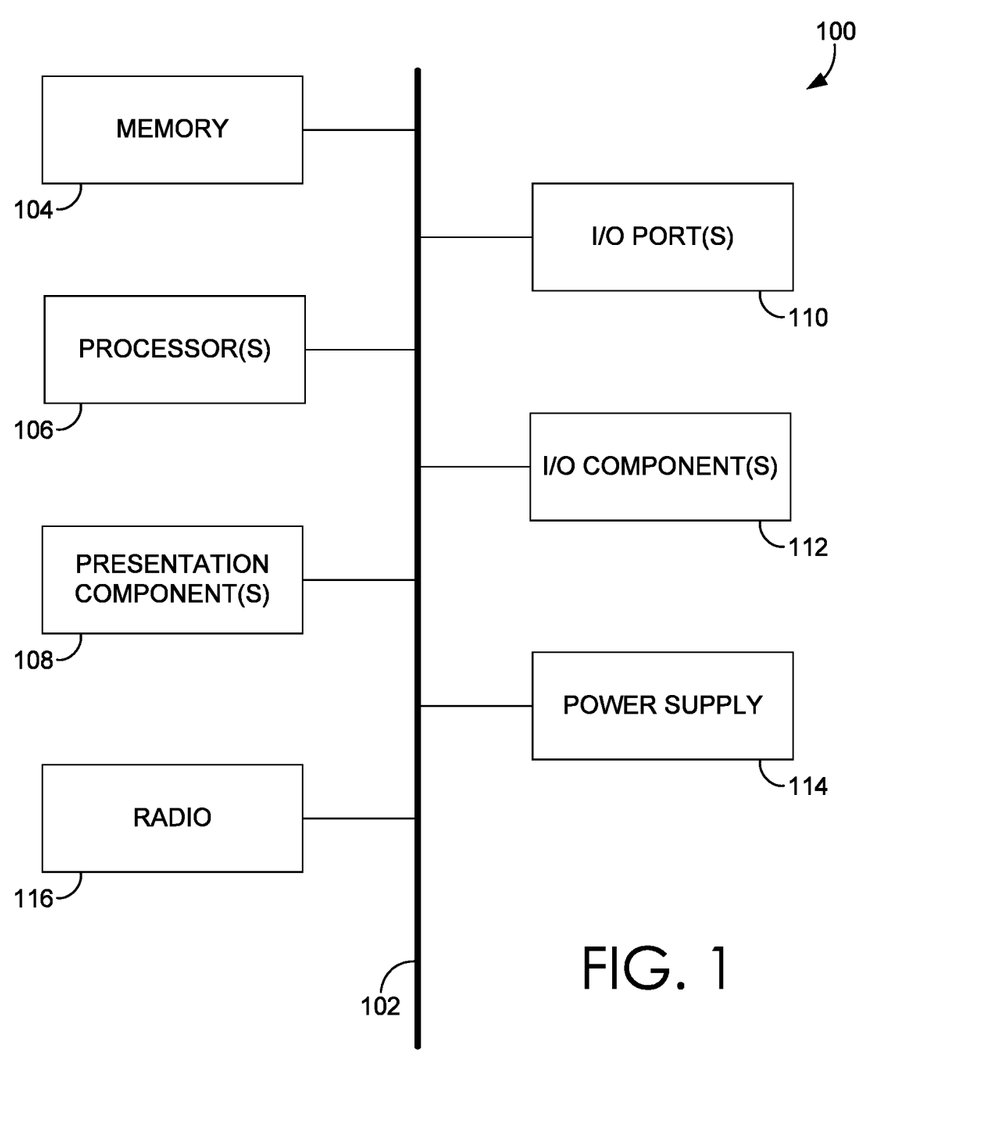
FIG. 1 depicts a diagram of an exemplary computing environment suitable for use in implementations of the present disclosure.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
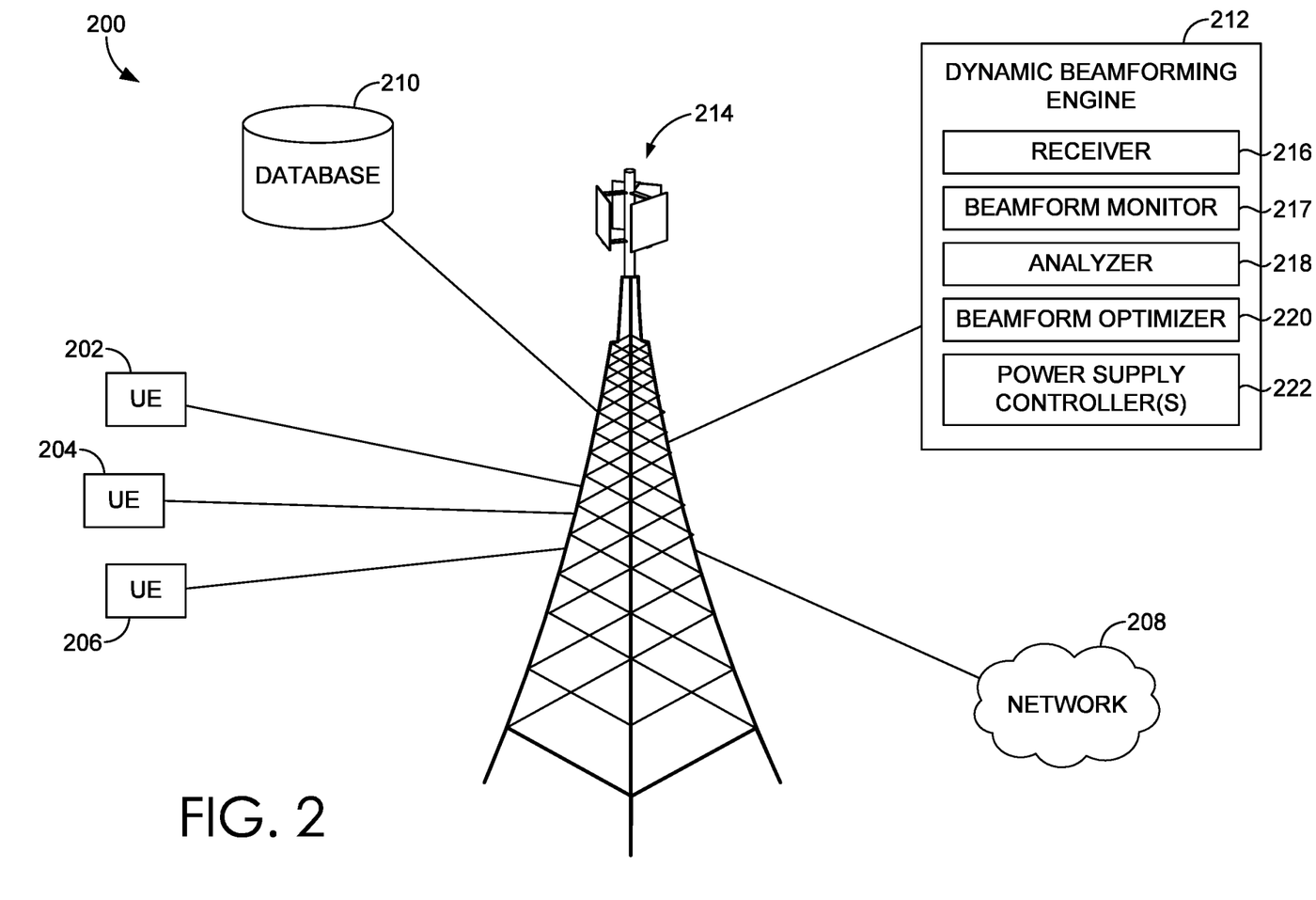
FIG. 2 illustrates a diagram of an exemplary network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes user devices (items 202, 204, and 206), cell site 214, network 208, database 210, and dynamic beamforming engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with a public or private network.

In some aspects, the user devices (items 202, 204, and 206) can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, a user device (items 202, 204, and 206) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the user devices (items 202, 204, and 206) in network environment 200 can optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., LTE) to user devices, such as user devices 202, 204, and 206. For example, network 208 may provide voice, SMS, and/or data services to user devices or corresponding users that are registered or subscribed to utilize the services provided by a telecommunications provider. Network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, cell site 214 is configured to communicate with user devices, such as user devices 202, 204, and 206 that are located within the geographical area, or cell, covered by radio antennas of cell site 214. Cell site 214 may include one or more base stations, base transmitter stations, radios, antennas, antenna arrays, power amplifiers, transmitters/receivers, digital signal processors, control electronics, GPS equipment, and the like. In particular, cell site 214 may selectively communicate with the user devices using dynamic beamforming. When a cell has users with user devices spatially separated from one another (e.g., high rise buildings, offices during the workday) at one time and spatially grouped together (e.g., nightclub, convention) at another time, traditional beamforming may not be able to capture most or all of the user devices at one time or another (or both) as adjusting a beamform only horizontally or only adjusting gain would not allow the beam to dynamically and simultaneously change in the x, y, and z planes (at least some change in each plane being consistent with the term 3D beamforming as used herein).

As shown, cell site 214 is in communication with dynamic beamforming engine 212, which comprises various components that are utilized, in various implementations, to perform one or more methods for dynamically adjusting 3D beamforms emitted from an antenna array in one or more wireless communications networks. In some implementations, dynamic beamforming engine 212 comprises components including a receiver 216, a beamform monitor 217, a location analyzer 218, a beamform optimizer 220, and one or more power supply controllers 222. However, in other implementations, more or less components than those shown in FIG. 2 may be utilized to carry out aspects of the invention described herein.

The receiver 216 of the dynamic beamforming engine 212 is generally responsible for receiving information from various user devices, such as user devices 202, 204, and 206, that are within the coverage area of cell site 214. Information sent from a user device to the cell site 214 may comprise location information of the user device and channel quality information that includes information on how good or bad the communication channel quality is. Location information may be based on GPS or other satellite location services, terrestrial triangulation, an access point location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Location and channel quality information may take into account the user device capability, such as the number of antennas and the type of receiver used for detection.

The beamform monitor 217 is generally responsible for determining a first beamform emitted by the cell site 214. As will be discussed herein, a first beamform may be considered a first beamform in time; that is, the first beamform is emitted by the cell site at a time prior to a time that a second beamform is emitted. As used herein, the term beamform may be considered to be synonymous with a radiation pattern at a particular time. Radiation pattern, as used herein, may generally refer to the gain (dBi) of any one or more beamforms. The radiation pattern of any one or more beamforms may be considered to have a 3D shape in the x, y, z planes. In addition to monitoring the radiation pattern created by the emission of two or more antennas of an antenna array at a cell site 214, the beamform monitor 217 may also monitor the power supply to each of the two or more antennas of the antenna array at the cell site 217.

The analyzer 218 is generally responsible for combining location and channel quality information received by the receiver 216, and comparing it to the first beamform as determined by the beamform monitor 217. The analyzer 218 may consider whether channel quality of a user device is above or below a threshold and/or may consider the distribution of user devices within the cell. As will be discussed herein, the analyzer may compare the location and channel quality information of the user devices in the cell with a first beamform. In embodiments, when multiple channel quality information and/or location information is received from multiple user devices, the analyzer may use an average, mean, median or any other statistical analysis to determine a single channel quality information and/or location of a particular user device.

The beamform optimizer 220 is generally responsible for determining a second beamform based on the channel quality and location information of the plurality of user devices from the analyzer 218. The beamform optimizer 220 may determine that the first beamform should be modified in any one or more of the x, y, and z planes in order to better serve one or more user devices within the cell. The beamform optimizer may determine the phase and amplitude shift necessary for any one or more power supplies, each power supply connected to a single antenna of the antenna array, to cause the antenna array to emit a second beamform.

The power supply controller 222 is generally responsible for adjusting the one or more power supplies as determined by the beamform optimizer. The power supply controller 222 may modify the phase and/or the amplitude of the power supply to any one or more antennas of the antenna array of the cell site 214. In cases where a second beamform is required to have a different vertical radiation pattern than a radiation pattern of the first beamform, the power supply controller may adjust the phase and/or amplitude of the power supply to a first antenna in a first row of the antenna array and not change the phase and/or amplitude of the power supply to a second antenna in a second row of the antenna array—thus capturing more user devices or improving the channel quality of the captured user devices having an elevational distribution.

Figure 3A:
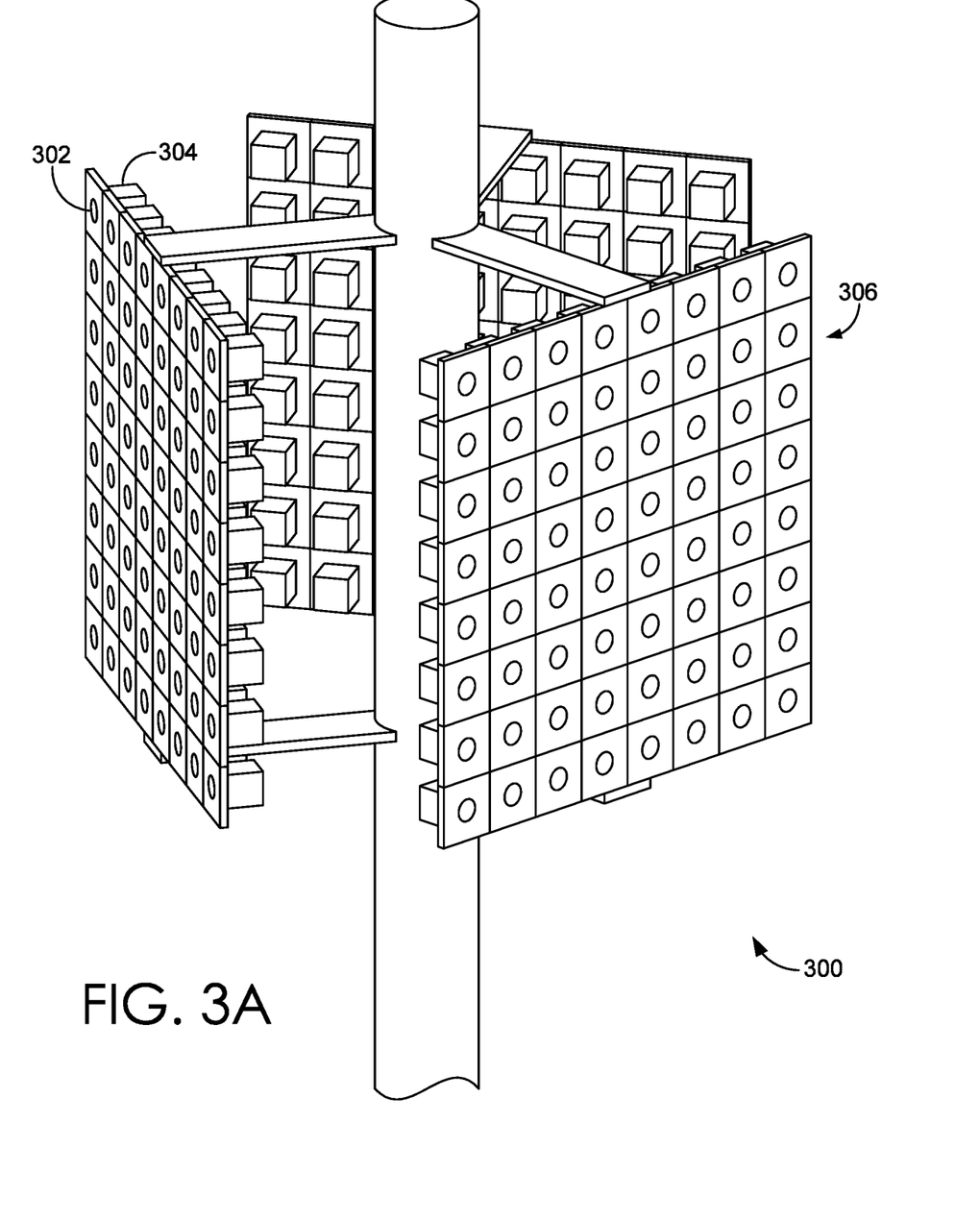
FIGS. 3A-3B each depict a graphical representation of a base station configuration suitable for use in embodiments of the present disclosure.
Figure 3B:
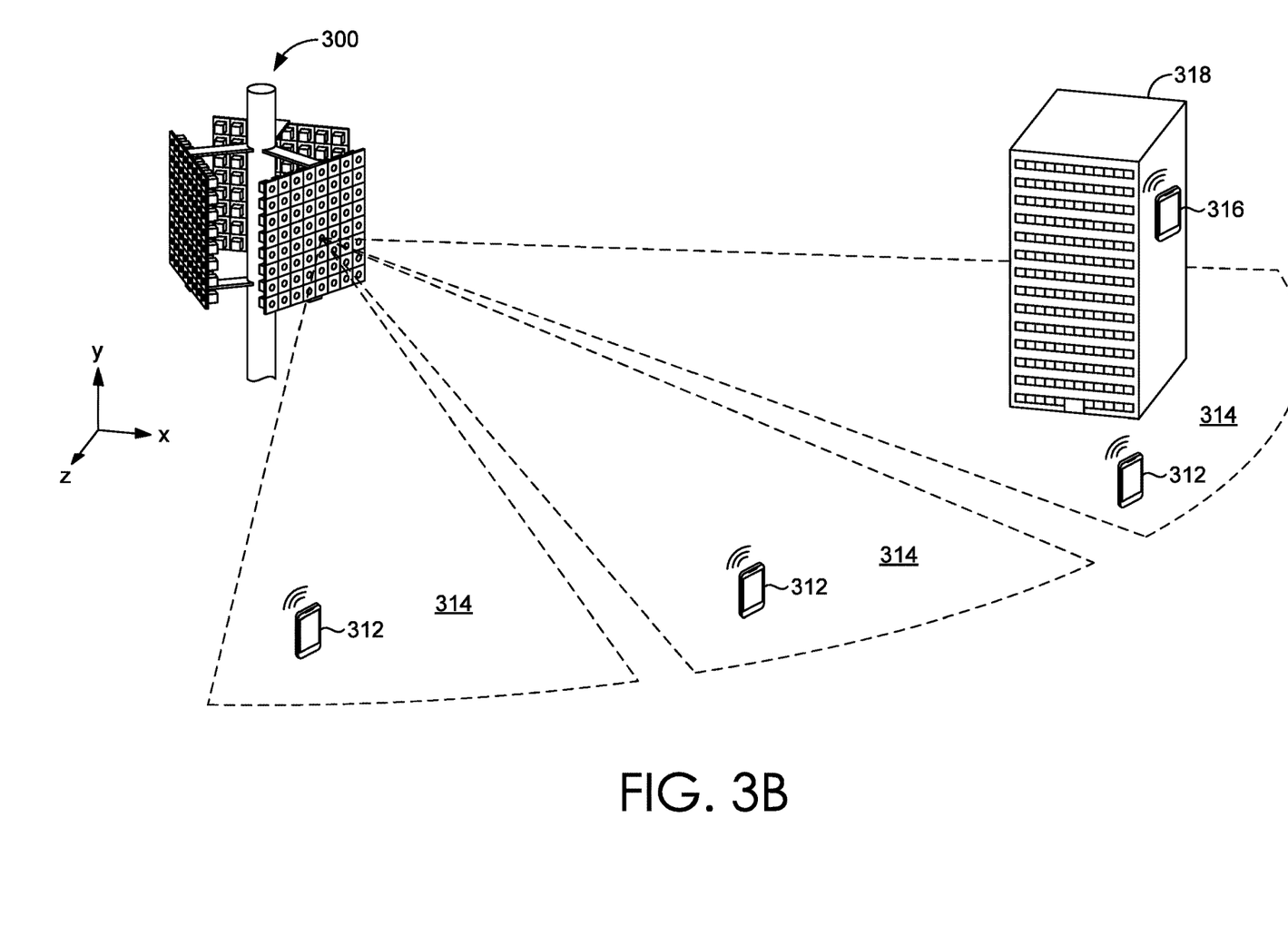

Turning now to FIGS. 3A and 3B, an exemplary base station configuration suitable for use in implementing embodiments of the present disclosure is illustrated and designated generally as base station 300. Base station 300 is but one example of a suitable configuration and is not intended to suggest any limitations as to the scope of use or functionality of embodiments described herein. Neither should the configuration be interpreted as having any dependency or requirement relating to any one or combination of components illustrated.

Base station 300 comprises at least one antenna array 306, each antenna array having one or more antennas 302. In aspects, the one or more antennas 302 may be dipole antennas, having a length, for example, of ¼, ½, 1, or 1½ wavelength. In aspects, the antenna array may be an active antenna array, FD-MIMO, massive MIMO, 3G, 4G, 5G, and/or 802.11. While we refer to dipole antennas herein, in other aspects, the antenna may be monopole, loop, parabolic, traveling-wave, aperture, yagi-uda, conical spiral, helical, conical, radomes, horn, and/or apertures, or any combination thereof. It is noted that adjusting one or more individual power supplies to antennas of an antenna array may be broadly applicable to an antenna array comprising any type of antenna targeting any portion of the RF spectrum (though any lower than VHF may be size prohibitive). In one aspect, the antenna may be configured to communicate in the UHF and/or SHF spectrum, for example, in the range of 1.3 GHz-30 GHz.

By way of a non-limiting example, the antenna array 306 may comprise 64 antennas 302 arranged in an 8×8 structure. In other aspects, the antenna array 306 may comprise antennas arranged in an 8×4, 4×8, or 4×4 configuration. Each antenna 302 of the antenna array 306 comprises a dedicated power supply 304. The power supply 304 supplies power having a certain phase and amplitude to antenna 302. In an embodiment, the power supply comprises a power amplifier and power controller. In other aspects, the power supply may additionally comprise a processor for making power supply determinations.

Base station 300 may have, for example, a first beamform. The first beamform may serve an area 314. For a ground level UE 312 in the served area 314, a quality of service may be satisfactory, but for an elevated UE 316, a quality of service may not be satisfactory. In a non-limiting example, the elevated UE 316 may not be in the served area because the elevation of its position is outside the areas served by the first beamform (e.g., may be on an upper level of a high-rise building 318). Thus, in order to satisfactorily serve both the ground level UE 312, and the elevated UE 316, the beamform must be adjusted at the base station 300 to produce a beamform that can provide acceptable service to all user devices in its served area.

Figure 4A:
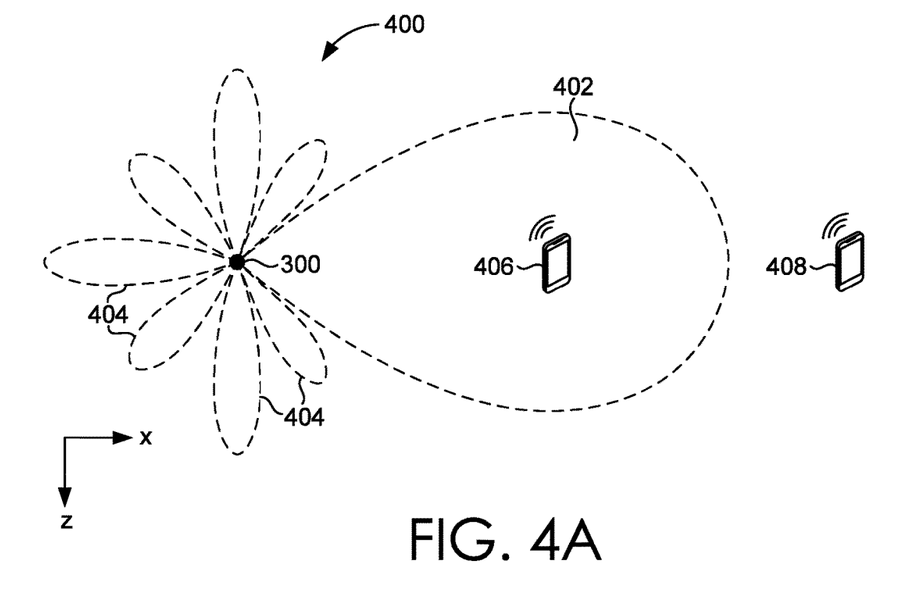
FIG. 4A-4B depicts a horizontal cross section of a beamform produced by an antenna in accordance with aspects herein.

Turning now to FIG. 4A, a horizontal cross section of a profile pattern of a first beamform 400 is illustrated in accordance with aspects described herein. The first beamform 400 is produced by emissions from a first antenna and a second antenna of the antenna array at base station 300. The horizontal cross section of the profile pattern also corresponds to a top down view of the main beam of the first beamform. The profile pattern of the first beamform includes a main beam 402, side lobes 404, and nulls between the side lobes and/or main beam. The side lobes 404 and nulls are merely illustrative examples and may be varied in number, shape, placement, and location. As used herein, an area served by a beamform may be thought of as the area covered by the main beam.

As can be seen in FIG. 4A, an area served by the first beamform 400 includes a first UE 406 but does not include a second UE 408. In a non-limiting example, the first UE 406 may be positioned at or near ground level at some distance x from the base station 300; the second UE 408 may be positioned at or near the top of a building (416 in FIGS. 4C, 4D) at some distance 2x from the base station 300. The UE 406, at or near ground level and inside the area covered by the first beamform, may be provided with satisfactory coverage and throughput on the wireless communication network served by base station 300. The UE 408, at or near the top of a building and outside the area covered by the first beamform, may not have satisfactory coverage and poor (or no) throughput on the wireless communication network served by base station 300.

In aspects, UE 406 and UE 408 utilize time division duplex (TDD) frame structures. In other aspects, UE 406 and UE 408 utilize frequency division duplex (FDD) frame structures. In yet other embodiments, one of the UE may use TDD and another may use FDD. In aspects, the base station 300 may communicate with the UE using 3G, 4G, LTE, CDMA, single carrier frequency division multiplexing access (SC-FDMA), orthogonal frequency division multiplexing access (OFDMA), or any other one or more communication protocols. In some aspects, the base station may be capable of communicating using a first protocol to communicate with a first device and a second communication protocol to communicate with a second device—based at least in part on the capabilities of the device and/or the type of data session between a device and the base station.

In an embodiment, the positions of UE 406 and UE 408 are determined and compared to the area covered by the first beamform 400. In aspects, both the UE 406 and the UE 408 provide location and channel quality information to the wireless communication network via the base station 300. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the base station 300 or at the individual antenna array of the base station 300. In other aspects, the processing of said information may be done remotely.

In an alternate embodiment, historical positions of a plurality of UE within the cell may be analyzed to forecast likely positions of UE 406 and UE 408 and associated channel quality. In such an embodiment, historical location and channel quality information of the type described above may be analyzed to determine an average distribution and channel quality of a plurality of UE within a cell at a predetermined time. Such forecasts may be different during the working hours of a business day, for example, than a Friday evening, which may yet be different than during a Sunday morning. Analyzed historical data and accompanying forecasts may be as granular as 7:30 am-8:30 am on a Monday morning (corresponding to Monday morning rush hour) or as broad as August-May (corresponding to an example of a school year).

In yet another embodiment, network data may be used, at least in part, to determine the second beamform. Network data may be processed locally at the base station 300, or the individual antenna array of the base station. In other aspects, the network data may be processed remotely. Network data may include tonnage, number of connected devices, registration address of devices, and/or biographic information associated with one or more user devices supplied by a registration and/or AAA system.

Figure 4B:
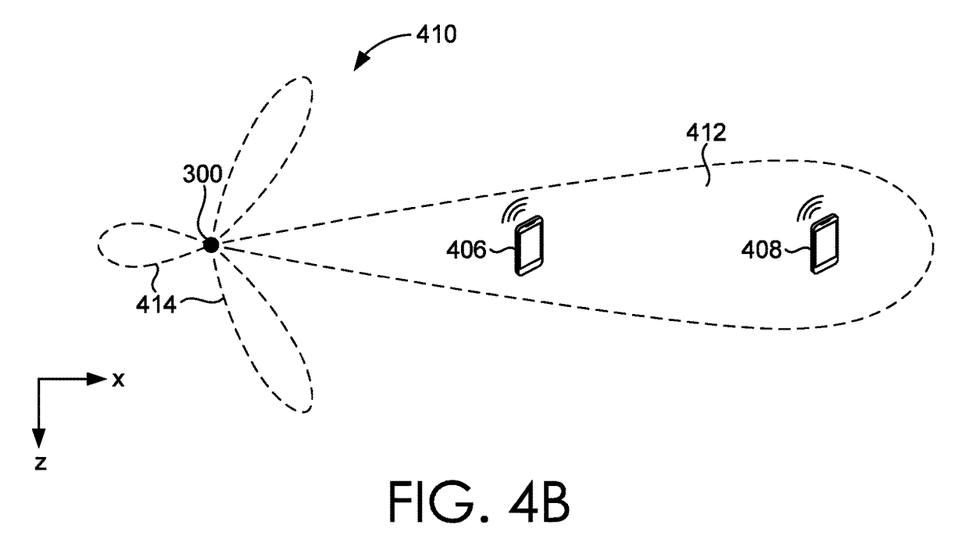

Whether historical or live location data is used, a UE 408 may be determined to not be within the area covered by the first beamform 400. Alternatively or additionally, the UE 408 may be determined to be physically within the area covered by the first beamform but channel quality information indicates that the connection is unsatisfactory. In either (or both) instance(s), the power supply to at least one antenna is adjusted to form a second beamform 410. In an embodiment, each antenna is supplied by a single power supply, such as a power amplifier. A power supply to an antenna may be adjusted using a change in phase and/or amplitude of said power supply. In aspects, only a phase shift of the power supply to the antenna may be required to produce the second beamform 410. In other aspects, only an amplitude change of the power supply to the antenna may be required to produce the second beamform 410. In yet other aspects, both a phase shift and an amplitude change of the power supply to the antenna may be required to produce the second beamform 410. In embodiments, adjusting the power supply to one antenna may be sufficient to produce the second beamform 410. In other embodiments, adjusting the power supply to each of multiple antennas may be required to produce the second beamform 410. In a non-limiting example, each power supply to each antenna in the top row of an antenna array may be adjusted in order to produce the second beamform 410.

Turning now to FIG. 4B, a horizontal cross section of a profile pattern of a second beamform 410 is illustrated in accordance with aspects described herein. The second beamform 410 is produced by emissions from a first antenna and a second antenna of the antenna array at base station 300. The horizontal cross section of the profile pattern also corresponds to a top down view of the main beam of the second beamform 410. The profile pattern of the second beamform includes a main beam 412, side lobes 414, and nulls between the side lobes and/or main beam. The side lobes 414 and nulls are merely illustrative examples and may be varied in number, shape, placement, and location. As used herein, an area served by the second beamform 410 may be thought of as the area covered by the main beam 412.

In aspects, both UE 406 and UE 408 lie within the area served by the second beamform 410. In embodiments, the second beamform 410 is different than the first beamform 400 of FIG. 4A. The second beamform, formed as a result of adjusting the power supply, may provide better overall service to UE 406 and UE 408. In aspects, the throughput to UE 406 may decrease but remain satisfactory in the second beamform while improving the throughput of UE 408 from unsatisfactory to satisfactory, increasing the overall service of the UE in a cell served by the base station 300. In other aspects, both UE 406 and UE 408 have their throughput improved by adjusting the power supplies of one or more antennas to form the second beamform 410.

Figure 4C:
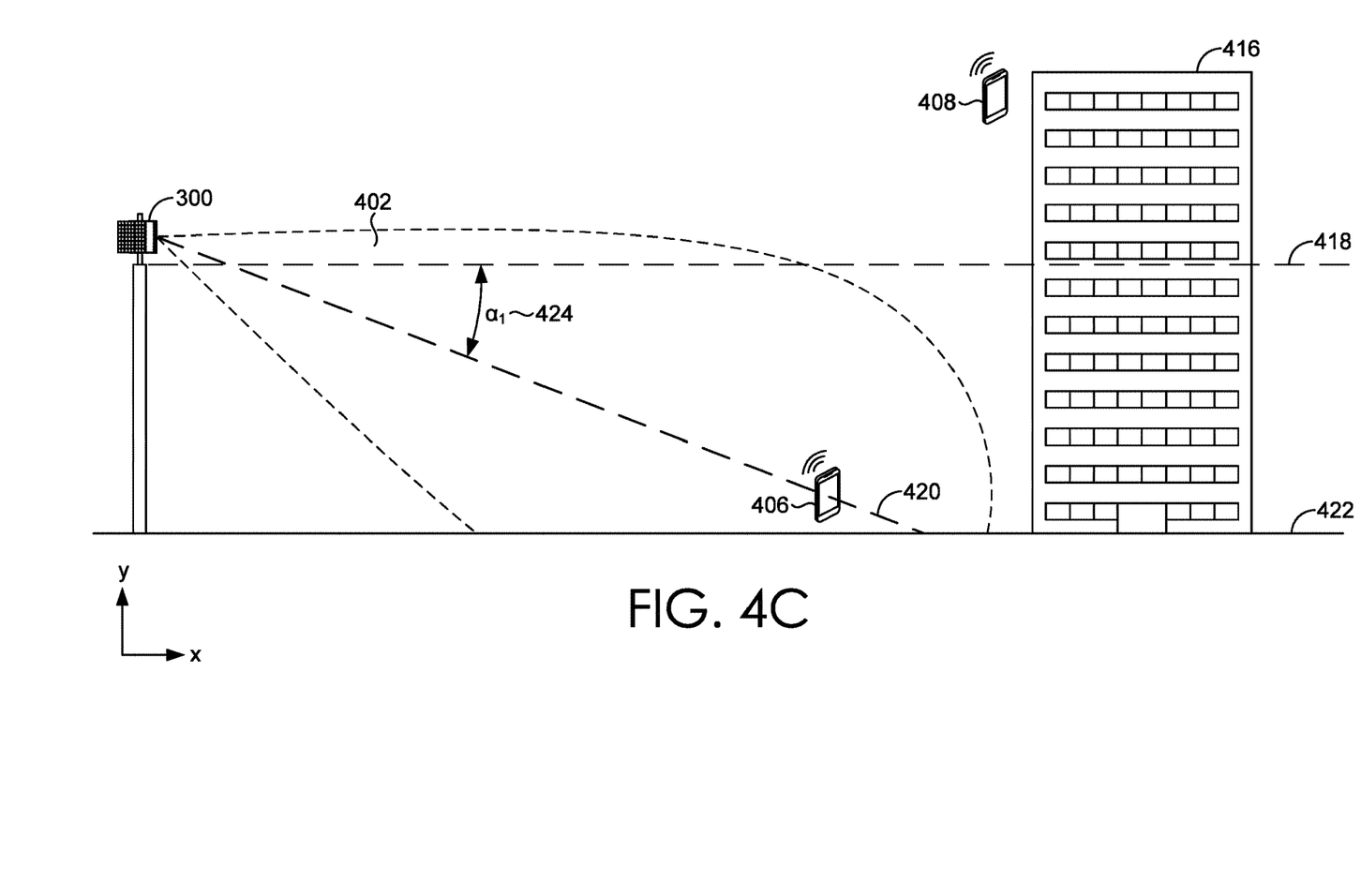
FIGS. 4C-D depicts a vertical cross section of a beamform produced by an antenna in accordance with aspects herein.

Turning now to FIG. 4C, a vertical cross section of a profile pattern of the first beamform 400 is shown in accordance with aspects described herein. Generally, a boresight is a central imaginary axis 420 of a three-dimensional main beam 402 that is projected outward from the base station 300 to the ground 422 through the center of the main beam 402. An angle of incidence 424 is formed between the boresight axis 420 and an imaginary axis 418, parallel to the ground, projected outward from the base station 300. As described above, the UE 406 is within the area covered by the first beamform; however, the UE 408 is not. In aspects, the UE 408 at or near the top of a high-rise building 416.

Figure 4D:
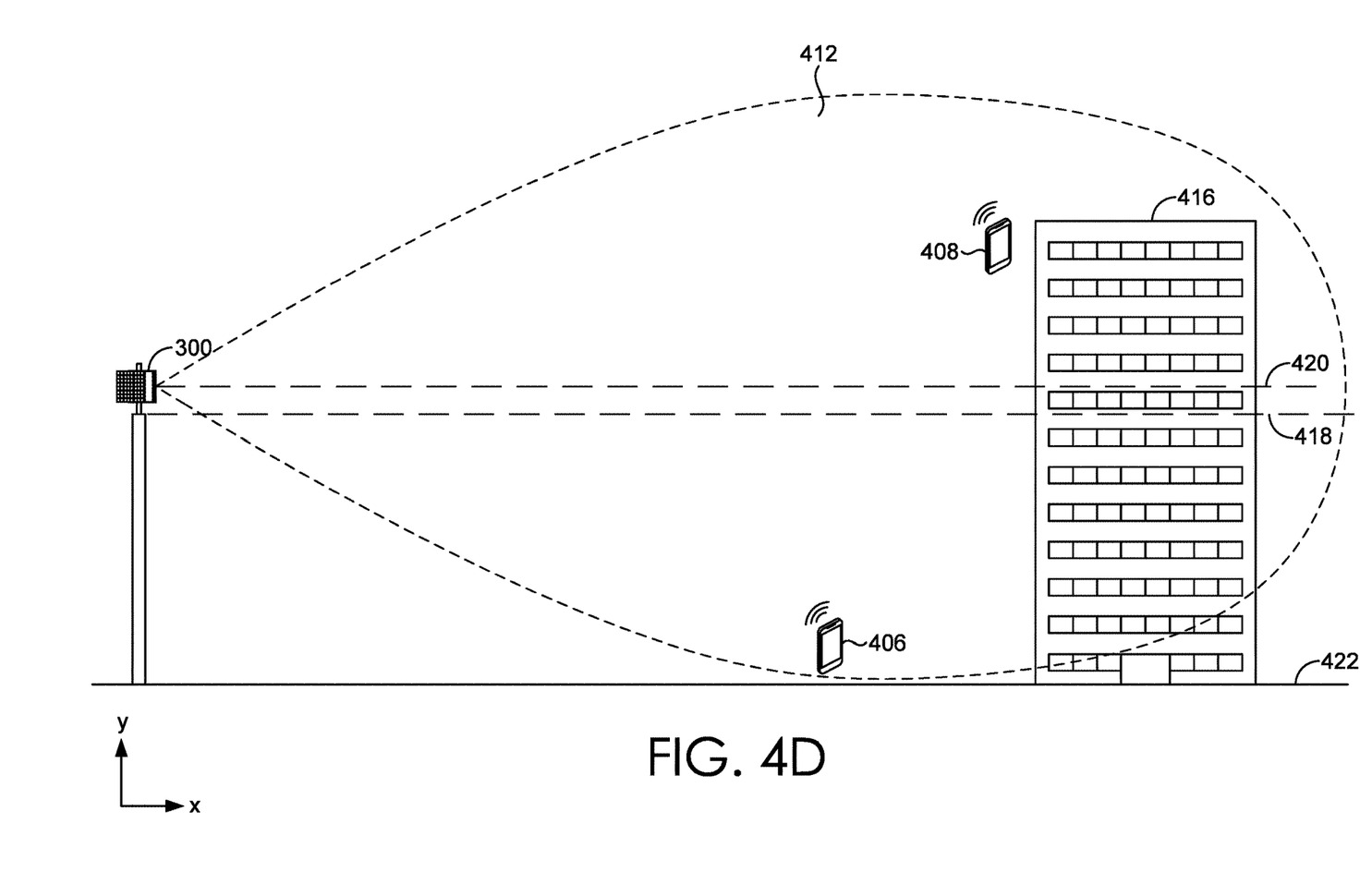

Turning now to FIG. 4D, a vertical cross section of a profile pattern of the second beamform 410 is shown in accordance with aspects described herein. The boresight 420 of the second waveform is parallel to the ground 422 and the imaginary axis 418. As described in relation to FIG. 4B and in contrast to FIG. 4C, both the UE 408 and the UE 406 are within the area served by the second beamform.

Comparing FIGS. 4C and 4D illustrates that by adjusting the power supply to one or more antennas, the second beamform 410 has a different vertical radiation pattern than the radiation pattern of the first beamform—that is, by adjusting the power supply, the radiation pattern of the first beamform was vertically beamformed to become the radiation pattern of the second beamform. In aspects, the horizontal and distance characteristics of the first beamform and the second beamform may be the same. In other aspects, and as illustrated by the differences in FIGS. 4C and 4D, the second beamform has different distance characteristics than the first beamform in addition to different vertical characteristics. In yet other aspects, and as illustrated by the differences in FIGS. 4A and 4B, the second beamform has different horizontal characteristics than the first beamform in addition to different vertical characteristics. In other aspects, the second beamform may have different characteristics than the first beamform in all three x, y, z, planes.

Figure 5:
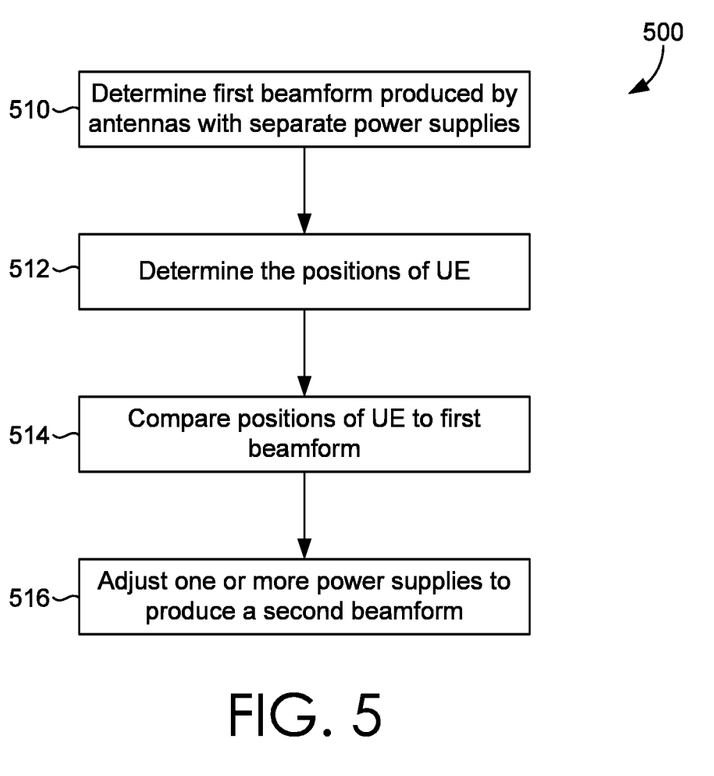
FIG. 5 depicts a flow diagram of an exemplary method for dynamically varying one or more power supplies to an antenna array to adjust a beamform, in accordance with implementations of the present disclosure.

Turning now to FIG. 5, a flow diagram is illustrated of an exemplary method 500 for dynamically varying one or more power supplies to an antenna array to adjust a beamform, in accordance with implementations of the present disclosure.

Initially at block 510, a first beamform produced by the emission of a first and a second antenna is determined. As described above, the first antenna and the second antenna are both part of an antenna array, and each has its own power supply. The state of the power supply to each of the first and the second antennas may also be determined as part of block 510. Understanding the power supply to each of the first and second antennas and the beamform produced by an emission of the first antenna and an emission of the second antenna provides status quo information that is critical to determining how one or more power supplies should be adjusted in later steps.

At block 512, positions of a plurality of UE in a cell are determined. Position information of the plurality of UE in a cell may be provided based on geographic location information of each UE obtained as discussed above. In addition to the positions of UE in the cell, channel quality information may also be obtained from one or more of the UE providing position information. Location and channel quality information may be communicated from the UE to the base station. In turn, the information from the UE may be processed at the base station or may be relayed to a remote one or more processors in order to determine the positions and channel quality information associated with one or more of the plurality of UE in the cell. As described in greater detail above, geographic locations and channel quality information of UE in a cell may be real-time information or may be forecasted likely positions based on analysis of historical data.

At block 514, the positions and optional channel quality information is compared to the first beamform (as determined in block 510). For instance, a first UE may be positioned within the area covered by the first beamform while a second UE may be positioned at the edge or beyond the area covered by the first beamform. Alternatively, both UE may be covered by the first beamform, although one UE may have an unsatisfactory channel quality, as discussed above. In either event, a method in accordance with aspects herein may proceed to block 516. In the case where every UE in the cell is optimally served by the first beamform, no further action may be taken until the method re-initiates (which may be done at any time interval).

In an embodiment, comparing the first beamform to the positions and optional channel quality information of a plurality of UE in a cell may reveal that the plurality of UE in the cell are all located in the area covered by the first beamform and have satisfactory channel quality. Nonetheless, aspects herein may compare the location and channel quality of the plurality of UE to the first beamform to determine that a second beamform could be used to more effectively or efficiently serve the plurality of UE in the cell. For example, if a UE positioned within the area covered by the first beamform has a satisfactory throughput, it may nonetheless experience latency, or noise. An aspect of the present invention may proceed to block 516 to improve the latency or noise experienced by the UE despite the fact that every UE in the area covered by the first beamform was satisfactorily served. Such a case may be to remedy the negative effects of multipathing or other interference.

At block 516, one or more power supplies is adjusted to produce a second beamform. In an embodiment, each antenna in an antenna array is supplied with a separate power supply. In one aspect, it may be determined that an emission from a first antenna of the antenna array should have its emission changed to adjust the overall radiation pattern produced by the antenna array. In such an aspect, either the phase, amplitude, or both, of the power supplied to the first antenna by the first power supply may be adjusted to change the emission. In some aspects, the power supply may comprise a power amplifier and power controller that work in combination to control the phase and/or amplitude of the power supplied to the first antenna. In a different aspect, multiple antennas may have their power supplies modified to produce a different radiation pattern of the antenna array. In such a case, a first power supply may only change the phase of the power supplied to the first antenna, a second power supply may only change the amplitude of the power supplied to a second antenna, and a third power supply may change both the phase and the amplitude (in the same or different amounts as the first and second power supplies) of the power supplied to a third antenna. One skilled in the art would readily appreciate that in, for example, a massive MIMO antenna array having 64 elements, as few as one, or as many as all of the antennas may have their power supplies modified to produce a second beamform. In aspects, the second beamform may provide coverage to a UE not covered by the first beamform. In other aspects, the second beamform may provide improved throughput to a UE covered by the first beamform but with an unsatisfactory connection/throughput.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for dynamically adjusting a beamform in one or more wireless communications networks, the method comprising:
   determining that a first antenna of an antenna array is supplied with a first power supply and a second antenna of the antenna array is supplied with a second power supply, wherein an emission from the first antenna and an emission from the second antenna produces a first beamform;
   determining positions of a plurality of UE in a cell served by the antenna array;
   comparing the positions of the plurality of UE in the cell to an area served by the first beamform; and
   adjusting one or more of the first power supply and the second power supply to produce a second beamform.

2. The method of claim 1, wherein the second beamform is different than the first beamform, the second beamform providing better throughput to one or more of the plurality of UE in the cell than the first beamform.

3. The method of claim 2, wherein the second beamform has different gain characteristics in vertical space than the first beamform, without physically changing the position of the first antenna and the second antenna.

4. The method of claim 1, wherein the first antenna and the second antenna are disposed in different rows of the antenna array.

5. The method of claim 1, wherein prior to adjusting one or more of the first power supply and the second power supply, the channel quality of the plurality of UE is determined in addition to the positions of the plurality of UE in the cell and compared to the area served by the first beamform.

6. The method of claim 5, wherein the one or more wireless communications network communicates with the plurality of UE using time division duplex (TDD).

7. The method of claim 6, wherein the channel quality of the plurality of UE is determined utilizing any one or more of: uplink pilot time slot, sounding resource signal, sounding reference signal, channel quality indicator, tonnage, number UE connected in the cell, uplink throughput rate, and downlink throughput rate.

8. The method of claim 1, wherein the positions of a plurality of UE in a cell is estimated based on historical distributions of UE in the cell.

9. The method of claim 1, wherein the antenna array comprises 64 dipole antennas, each of the dipole antennas comprising two conductive elements, the dipole antennas of the array arranged in a pattern eight dipole antennas wide by eight dipole antennas tall.

10. The method of claim 1, wherein the first power supply comprises a first power amplifier and a first power controller and the second power supply comprises a second power amplifier and second power controller.

11. The method of claim 10, wherein the second beamform is produced by adjusting the phase of the one or more of the first power supply using the first power amplifier and the second power supply using the second power amplifier.

12. The method of claim 11, wherein the second beamform is produced by adjusting the amplitude of the one or more of the first power supply using the first power amplifier and the second power supply using the second power amplifier.

13. A non-transitory computer storage media storing computer-usable instructions that, when used by one or more processors cause the one or more processors to:
   determine that a first antenna of an antenna array is supplied with a first power supply and a second antenna of the antenna array is supplied with a second power supply, wherein an emission from the first antenna and an emission from the second antenna produces a first beamform;
   estimate positions of a plurality of UE in a cell served by the antenna array based on historical locations of UE in the cell;
   compare the likely positions of the plurality of UE in the cell to the area served by the first beamform; and
   provide instructions to adjust one or more of the first power supply and the second power supply to produce a second beamform.

14. The non-transitory computer storage media of claim 13, wherein the second beamform is different than the first beamform, the second beamform providing better throughput to one or more of the plurality of UE in the cell than the first beamform.

15. The non-transitory computer storage media of claim 14, wherein the second beamform has different gain characteristics in vertical space than the first beamform, without physically changing the position of the first antenna and the second antenna.

16. A system for dynamically adjusting a beamform in one or more wireless communications networks, the system comprising:
   one or more processors;
   an antenna array comprising a first antenna and a second antenna; and
   one or more non-transitory computer storage media storing computer-usable instructions that, when used by the one or more processors, cause the one or more processors to:
   determine that the first antenna of the antenna array is supplied with a first power supply and the second antenna of the antenna array is supplied with a second power supply, wherein an emission from the first antenna and an emission from the second antenna produces a first beamform;
   determine the positions of a plurality of UE in a cell served by the antenna array;
   compare the positions of the plurality of UE in the cell to an area served by the first beamform; and
   provide instructions to adjust one or more of the first power supply and the second power supply to produce a second beamform.

17. The system of claim 16, wherein the first power supply is controlled by a first power amplifier and the second power supply is controlled by a second power amplifier.

18. The system of claim 17, wherein the one or more of the first supply and the second power supply is adjusted by the one or more of the first power amplifier and the second power amplifier changing the amplitude of one or more of the first emission and the second emission.

19. The system of claim 16, wherein the second beamform is different than the first beamform, the second beamform providing better throughput to one or more of the plurality of UE in the cell than the first beamform.

20. The system of claim 19, wherein the second beamform has different gain characteristics in vertical space than the first beamform, without physically changing the position of the first antenna and the second antenna.

* * * * *